United States Patent [19]

Langmesser, deceased et al.

[11] 3,760,058

[45] Sept. 18, 1973

[54] PROCESS LEADING TO THE PRODUCTION OF TITANIUM DIOXIDE PIGMENTS WITH A HIGH DEGREE OF WHITENESS

[75] Inventors: Paul Werner Langmesser, deceased, late of Krefeld, Germany; by Martha Adele Hildegard Langmesser, heir, Muenster/W.-Gremmendorf, Germany; Hans G. Volz, Krefeldbockum; Gerhard Kienast, Krefeld, both of Germany

[73] Assignee: Farbenfabriken Bayer Aktiengesellschaft, Leverkusen, Germany

[22] Filed: Feb. 19, 1971

[21] Appl. No.: 117,144

Related U.S. Application Data

[63] Continuation of Ser. No. 763,488, Sept. 18, 1968, abandoned.

[30] Foreign Application Priority Data

Sept. 25, 1967 Germany .......................... F 53576

[52] U.S. Cl. .................. 423/85, 423/544, 423/558, 106/300
[51] Int. Cl... C01g 23/00, C01g 23/06, C01g 23/08
[58] Field of Search ............................ 23/202, 117; 423/610, 615, 616, 85, 544, 552; 106/300

[56] References Cited
UNITED STATES PATENTS 1,504,669  8/1924  Blumenfeld ...................... 23/202 R
2,269,139  1/1942  Booge ............................... 23/202 R
2,290,111  7/1942  Merriam et al. .................. 23/202 R
2,292,507  8/1942  Brooks ............................. 23/202 R
3,341,291  9/1967  Mabbs et al. ..................... 23/202 R

OTHER PUBLICATIONS

Jelks Barksdale Book "Titanium," Second Edition, 1966, Pages 50 and 231. The Ronald Press Co., New York.

*Primary Examiner*—Edward Stern
*Attorney*—Burgess et al.

[57] ABSTRACT

Production of a hydrolysis solution used to form titanium oxyhydrate and in turn titanium dioxide pigments having a high degree of whiteness, by digesting titanium dioxide-containing raw material with sulfuric acid at a weight ratio of $TiO_2$ to $H_2SO_4$ of about 1:1–20, crystallizing the digested titanium in the form of titanyl sulfate dihydrate by adjusting the acid concentration, separating and redissolving the crystals to form an aqueous hydrolysis solution, and separating the hydrolysis solution from any undissolved constitutents present, to permit subsequent hydrolysis of the titanium content in the hydrolysis solution to form titanium oxyhydrate, and recovery of the oxyhydrate thereby formed for producing in turn $TiO_2$ pigment.

8 Claims, No Drawings

PROCESS LEADING TO THE PRODUCTION OF TITANIUM DIOXIDE PIGMENTS WITH A HIGH DEGREE OF WHITENESS

This application is a continuation of Ser. No. 763,488, filed Sept. 18, 1968, now abandoned.

This invention relates to a process for the production of titanium dioxide pigments with a high degree of whiteness by digesting materials containing titanium with sulfuric acid.

For some years now, it has been possible to obtain pigments of high purity by the so-called chloride process in which titanium tetrachloride is reacted with gases that contain oxygen. For this reason, attempts have been made to improve the so-called wet process to achieve similar good results. In the wet process which has been used for some time, the pigment is obtained by hydrolyzing solutions containing titanium sulfate. A plurality of separate stages are used in the wet process so that there is a definite need to simplify it. Normally, titanium dioxide pigments are commercially produced by the sulfate process in accordance with the following stages:

Starting from ilmenite or concentrates obtained from ilmenite, the material is first digested with sulfuric acid, the digested product is thereafter clarified, i.e., the undissolved solids are removed, the co-digested iron sulfate is crystallized out and separated off and the resulting pure, titanium-containing solution is concentrated and hydrolyzed. The hydrolysate is washed after filtration and, following an optional pre-treatment, e.g., bleaching, is calcined, ground and, if desired, subjected to further after-treatment, e.g., several process stages, depending upon the purpose for which the pigment is to be used. Following digestion with sulfuric acid and dissolution of the digested cake, a concentrated solution of sulfuric acid is left behind, containing the constituents of the ilmenite or titanium slag or concentrate used, i.e., in addition to the titanium, all the iron and other secondary constituents of the starting materials. Separation of the titanium from this solution, free of the remaining dissolved constituents, e.g., $FeSO_4$, constitutes a major problem in the production of titanium dioxide and determines the properties of the pigment and, in particular, its degree of whiteness. Accordingly, a number of modifications to the process described above have been put forward with the two-fold object of separating the titanium in pure form.

It is therefore an object of the present invention to provide a titanium dioxide pigment with a high degree of whiteness, i.e., a titanium dioxide being substantially free of coloring impurities. A further object is a simplification of the process by providing readily filterable precipitates and by reducing the number of the necessary process steps.

A process for the production of titanium dioxide pigments with a high degree of whiteness has now been found by the technic of digesting materials containing titanium dioxide with sulfuric acid separating the digested titanium from the remaining constituents crystallizing the titanium dioxide and working up the crystal to give the completed pigment the process which comprises the following steps:

1a. Digesting the titanium containing material at temperatures in the range of from 100° C up to the boiling point of the solution with a 40 % to 70 % by weight sulfuric acid using a ratio by weight of $TiO_2$ to $H_2SO_4$ of from 1:1 to 1:20.

1b. Crystallizing the dissolved titanium at temperatures of from about 60° C to 150° C in the form of titanyl sulfate dihydrate for which purpose the acid concentration is adjusted in such a way that on completion of crystallization it is between 2 and 13 moles, e.g., 2 : 13 molar $H_2SO_4$.

2. Removing the precipitated crystals by filtration.

3. Redissolving the titanyl sulfate dihydrate crystals whereby a $TiO_2$ concentration of from 100 or 150 to 400 g/l is maintained upon such redissolving.

4. Separating off the resulting solution from any undissolved constituents.

5. Recovering the $TiO_2$ pigment from the solution by hydrolyzation. The hydrolyzate is then worked up as known per se. With an exception, however, that the bleaching step of the hydrolyzate can be omitted.

In a 2 to 13 acidic solution in which titanyl sulfate dihydrate is stable in the form of highly insoluble crystals it is possible to separate off the titanium dissolved during digestion in the form of crystals ($TiOSO_4 \cdot 2 H_2O$) and to recover the titanium in pure form from the remaining constituents, especially iron sulfate which have entered into solution because the titanly sulfate dihydrate shows hardly any tendency to form solid solutions with other sulfates.

It is also possible by this method to simplify the process as a whole because the titanium is initially crystallized following digestion, after which it can readily be separated from the undissolved constituents of the starting material following separation of the solution and redissolving. Compared with the conventional process, therefore, at least one process stage is saved. Since the subsequent hydrolysis of the re-dissolved titanyl sulfate dihydrate is almost entirely free of harmful ions, a pure end product is formed which is totally free of any constituents capable of detrimentally affecting the natural color of the titanium dioxide pigment.

It is also important that the needle-like configuration of the titanyl sulfate dihydrate crystals facilitates quick filtration and washing, with the result that they can be separated much more easily and more quickly from the secondary constituents of the titanium-containing starting material that have entered into solution.

In precipitating the titanyl sulfate dihydrate, it is of advantage to add seed crystals of crystalline $TiOSO_4 \cdot 2 H_2O$. In particular, the process according to the invention is carried out as follows:

The titanium containing material, preferably ilmenite although other materials such as, for example, concentrates obtained from ilmenite and titanium-containing slags, i.e., such as those obtained from the iron industry after removal of some iron, may also be used, is treated with sulfuric acid at temperatures of from 100° C up to the boiling point of the digesting solution. The sulfuric acid concentration should amount to between about 40 and 70 % and preferably to between 45 and 55 % by weight, with an acid ratio ($gTiO_2 : g H_2SO_4$) of between about 1:1 to 1:20, and preferably of from about 1:2 to 1:10. On completion of digestion, the digested solution is brought to a temperature in the range of between about 60° C to 150° C, and preferably of from 100° C to 130° C, preferably without preliminary separation of the undissolved constituents, and sulfuric acid is added thereto in such a quantity that, after the titanyl sulfate dihydrate has been crystallized, a 2 to 13-molar, and preferably a 6 to 8-molar, acid concentration is attained thereby. In such case a 45 % to 55 % sulfuric acid concentration is preferably left after the TiOSO$_4$ · 2 H$_2$O has been crystallized. However, it is also possible to adjust the acid concentration by the introduction of hydrogen chloride. As already mentioned, it is of advantage to accelerate crystallization of the titanyl sulfate dihydrate by seeding or inoculating the digested solution with crystalline material (i.e., TiOSO$_4$ · 2 H$_2$O).

After the TiOSO$_4$ · 2 H$_2$O has been crystallized, the solution is separated off from any undissolved constituents and from the crystals by decantation or filtration, and the filtration residue is washed out with dilute sulfuric acid in a concentration of from 30 % to 70 %. The product washed out is then dissolved by the addition with stirring of water or dilute sulfuric acid to form an aqueous hydrolysis solution, a TiO$_2$-concentration of from about 150 to 400 g/l being maintained. The aforesaid concentration is maintained in order to precipitate TiO$_2$-particles, which have the effective particle size for the desired pigment-qualities. Following separation from the undissolved constituents, the TiO$_2$ is crystallized in the usual way by hydrolysis. For this purpose, the solution containing titanyl sulfate, following the addition thereto of Ti(III)-solution, e.g., chloride, sulfate or any other inorganic anion of Ti(III)-solution is poured while still hot into hot water at a temperature of from 50° to 100° C, and the resulting product is brought to the boil gradually and diluted with water with continued boiling in order to complete hydrolysis. On completion of hydrolysis, the hydrolyzate is separated off and worked up in the usual way. For this purpose, modifying agents such as, for example, zinc oxide, potassium oxide, and phosphates or silicates may be added to the hydrolyzate in known manner.

The product obtained after calcination is ground and optionally subjected to further after-treatment, in which the properties of the pigment are improved by developing the pigment particles with inorganic and/or organic materials. Treatment of the hydrolyzate and after-treatment of the calcined hydrolyzate will be determined by the particular purpose for which the TiO$_2$ pigment is to be used. Processes of this kind are described for example in Gmelin, 8th edition, System No. 41, and J. Barksdale "Titanium, its occurrence, chemistry and technology" (1949), and Ullmann, "Enz. d. techn. Chemie," Vol. 13 pp. 766 et. seq. Compared with pigments produced by conventional methods, the pigments produced by the process according to the invention are purer in color.

Compared with the conventional process the process of invention yields a titanium dioxide after the hydrolyzation step which does not contain impurities effecting whiteness of the calcined end products. It is therefore not necessary to bleach the hydrolyzate in order to render the impurites inocuous.

Compared with the common prior process the process of invention can be carried out much more quickly by virtue of the better filtration properties of the precipitates or solids to be removed in the various processing steps as can be seen from the following table:

TABLE I

| Prior art process | New process |
|---|---|
| 1. Digestion with sulfuric acid. | 1a. Digestion with sulfuric acid. |
| 2. Removal of the undissolved solids. | 1b. Precipitation of titanylsulfate dihydrate. |
| 3. Precipitation of iron sulfate. | 2. Separation off the titanylsulfate. |
| 4. Removal of the iron-sulfate. | 3. Redissolution of the titanylsulfate. |
| 5. Concentration of the resulting filtrate. | 4. Removal of the undissolved solids. |
| 6. Hydrolization. | 5. Hydrolyzation. |
| 7. Filtration. | 6. Filtration. |

Steps 1a and 1b in the process of invention as compared with step 1 and 2 of the old process can be considered as one single step. After the digestion has been finished the precipitation is effected merely by proper adjusting of the acid concentration. The separation off the titanyl sulfate dihydrate involves no difficulties because of the crystallinity of the precipitate whereas the removal of the iron sulfate in step 3 of the old process is rather time-consuming. The solution is to be cooled to temperatures as low as 30° C and the precipitate is rather voluminous.

Step 4 of the new process corresponds to step 2 of the old process. Step 3, however, the redissolution of the titanyl sulfate dihydrate thereby obtaining the proper TiO$_2$-concentration for the hydrolyzation step is simpler than step 5 of the old process. Last not least the hydrolyzate of the new process contains less impurities and the common bleaching step of the hydrolyzate in the old process can be omitted.

The process according to the invention is illustrated by the following Examples:

EXAMPLE 1

200 g of ground ilmenite were boiled under reflux with 866 g of 50 % H$_2$SO$_4$. After 11 hours, all the material had been dissolved except for a few traces. Another 976 g of a 53 % H$_2$SO$_4$ were added, followed by the introduction of 5 to 10 g of crystalline TiOSO$_4$ · 2 H$_2$O as seed. After 3 hours and 40 minutes, most of the titanium had crystallized out, the contents of the vessel having assumed a paste-like consistency. Crystallization was completed by another 6 hours' heating at 105° C. The crystal paste or sludge was then filtered while still hot, followed by a displacement wash with small quantities of a 47.5 % H$_2$SO$_4$.

Yield: 80 % of the titanium used in the form of TiOSO$_4$ · 2 H$_2$O. The mother liquor contained 11.3 % of FeSO$_4$ in a 51.9 % H$_2$SO$_4$ (in addition to 2.15 % of TiO$_2$).

EXAMPLE 2

100 g of ground ilmenite were boiled under reflux with 820 g of a 50 % H$_2$SO$_4$. After 11 hours, all the material had been dissolved except for some small traces. Another 920 g of a 67.9 % H$_2$SO$_4$ were added, followed by the introduction of 5 to 10 g of crystalline TiOSO$_4$ · 2 H$_2$O for seeding. After 3 1/2 hours, most of the titanium had crystallized out, the contents of the reaction vessel having assumed a paste-like consistency.

Crystallization was completed by another 8 hours' heating at 105° C. The crystal paste was then filtered while still hot and the filtration residue was subjected to a displacement wash with small quantities of a 56 % $H_2SO_4$.

Yield: 90 % of the titanium used in the form of $TiOSO_4 \cdot 2 H_2O$. The mother liquor contained 5.7 % of $FeSO_4$ in a 59.5 % $H_2SO_4$ (in addition to 0.8 % of $TiO_2$).

EXAMPLE 3

100 g of ground ilmenite were boiled under reflux with 212 g of a 50 % $H_2SO_4$, followed by the introduction of HCl. After 6 hours, most of the titanium had crystallized out in the form of a thick crystal paste of $TiOSO_4 \cdot 2 H_2O$. After cooling, the product of precipitation was filtered and washed out with a little cold water and then dissolved in 1,000 g of 2 N $H_2SO_4$. The solution was filtered and the filtration residue, which consisted of undigested ilmenite and which amounted to 19 % of the quantity used, was washed with a little water.

Yield: 90 % of the digested $TiO_2$ in the filtrate.

EXAMPLE 4

Water was added to filter-moist $TiOSO_4 \cdot 2 H_2O$ crystal cakes produced according to Examples 1, 2 and 3, to form a (4) solution containing 300 g of $TiO_2$/litre. The crystals were readily soluble, their dissolution being assisted by stirring. The solution was then (5) filtered from insolubles as in Example 3. following the addition of a little Ti(III)-sulfate-solution, the solution was (6) hydrolyzed as follows:

2,250 ml of the hot solution were run into 750 ml of hot water. After standing for 30 minutes, the product was brought to the boil and, after an interval of 20 minutes, 124 ml of water were slowly added with continued boiling. This was followed by another hour of boiling. The product was then (1) filtered and the deposit was thoroughly washed. The hydrolyzate had added thereto 3 % or rutile seeds, 1.2 % of ZnO, 0.3 % of $K_2O$ and 0.18 % of $P_2O_5$, and was calcined (for 2 ½ hours at 920° C). to give a product containing 99 % to 100 % of rutile. The calcined product of the invention was ground, giving a pigment with a brightening power (DIN 53 192) of 800 which, both in the form of a dry powder and in the form of an oil, was lighter and purer than a pigment produced in the usual way by the conventional sulfate process.

EXAMPLE 5

Prior art process:

100 g of ground ilmenite were mixed with 148 g of 98 % by weight of sulfuric acid. Thereafter water was added in an amount to yield a final acid concentration of 90 % by weight, whereby the digestion solution was slightly heated. After completion of the digestion the reaction solution was matured for another two hours and then filtered with water to yield a final $TiO_2$-concentration of 120 to 150 g/l. The dilution was accompanied by intensive stirring to avoid hydrolyzation of the $TiO_2$.

After the aforedescribed digestion step the final suspension containing the dissolved titanium oxide besides the dissolved impurities-mainly iron sulfate-was clarified by filtering through a heated filter whereby additives promoting filtration were added.

In step 3 thereafter the iron sulfate was removed by crystallization. The crystallyzation was effected by cooling the solution to a temperature of 30° C. In step 4 the precipitated iron sulfate was removed by filtration. By step 3 and 4 the molar ratio of iron sulfate to titanium dioxide was decreased from 2 to 1 to a value of about 0.7 to 1. In step 5 the final solution was concentrated by evaporating under reduced pressure (100 torr) to increase the titanium dioxide concentration to an amount of 230 to 250 $TiO_2$/l. After the addition of Ti(III)-sulfate solution (1 g $TiO_2$/l) the solution was heated to the boil (108°–110° C) for two hours in order to hydrolyze the titanium dioxide in the form of titanium dioxide hydrate. The hydrolyzation was completed by the addition of water in the course of 4 hours to yield a final concentration of 140 to 160 g $TiO_2$/l. The suspension was filtered and washed and then suspended again in water after the addition of 2 to 3 % by weight of rutile seed crystals. To this suspension was then admixed a small portion of Ti(III)-sulfate solution and again filtered and washed. The cake was then sucked dry and then resuspended in water, the concentration of the solids being about 30 %. Thereafter the suspension was admixed with 0.2 % of $P_2O_5$ in the form of $H_3PO_4$, 0.25 % $K_2O$ in the form of $K_2CO_3$ and 1.2 % of ZnO. Thereafter the solids were again separated off the aqueous phase and then calcined in a rotary furnace at a temperature of 900° to 950° C. After 2 to 2 ½ hours a product containing 99 – 100 % titanium dioxide in the form of rutil was then ground in a laboratory mill.

In the following Table II the properties of the $TiO_2$-pigments obtained by Example 4 and 5 are compared:

| Oil rubbing | Color and brightness in oil | Spectral remission of compressed powder samples (Elrepho, $\beta_{MgO}=100$) | |
|---|---|---|---|
| | | Brightness A | Yellow-tinge $R_x - R_z$ |
| Conventional rutile pigment. | About equal to standard. | 92.7 | 5.1 |
| Rutile pigment prepared by the process according to the invention. | Much purer and lighter than standard. | 94.3 | 3.7 |

What is claimed is:

1. Process for the production of a hydrolysis solution used to form titanium oxyhydrate and in turn titanium dioxide pigments having a high degree of whiteness which comprises digesting a previously undigested ilmenite with sulfuric acid having a concentration of substantially between about 40–70% by weight at a ratio by weight of $TiO_2$ to $H_2SO_4$ of substantially between about 1:1–20 and at a temperature of substantially between about 100° C and the boiling point of the digestion solution, crystallizing the resultant dissolved titanium in the form of titanyl sulfate dihydrate at a temperature of substantially between about 60°–150° C by further addition of acid to adjust the acid concentration such that on completion of the crystallization the acid concentration of the remaining solution is substantially between about 2–13 molar, separating the resultant crystals to form an aqueous hydrolysis solution having a $TiO_2$ concentration of substantially between about 100–400 g/l, and separating such hydrolysis solution from any undissolved constituents present.

2. Process according to claim 1, wherein the titanium content in such hydrolysis solution, after separation from such undissolved constituents, is hydrolyzed to form titanium oxyhydrate and such oxyhydrate is recovered.

3. Process according to claim 2, wherein the hydrolyzing of said titanium content is carried out at a temperature substantially between about 50°–100° C.

4. Process according to claim 1, wherein the titanium-containing raw material is digested with about 45–55% by weight sulfuric acid at the boiling point of the digesting solution.

5. Process according to claim 4, wherein the digesting is carried out at a ratio by weight of $TiO_2$ to $H_2SO_4$ of about 1:2–10.

6. Process according to claim 5, wherein the titanyl sulfate dihydrate is crystallized at a temperature of about 100°–130° C.

7. Process according to claim 6, wherein the titanyl sulfate dihydrate is crystallized by the further addition of acid to adjust the acid concentration such that on completion of the crystallization the acid concentration of the remaining solution is about 6–8 molar.

8. Process according to claim 1, wherein the crystallization of the titanium sulfate dihydrate is accelerated by inoculation with seed crystals of $TiOSO_4 \cdot 2 H_2O$.

* * * * *